United States Patent Office 2,798,072
Patented July 2, 1957

2,798,072

SUBSTITUTED BENZAMIDOPIPERIDINO-PROPANES

Albert Pohland, Indianapolis, Ind., assignor to Eli Lilly and Company, Indianapolis, Ind., a corporation of Indiana No Drawing. Original application December 9, 1953, Serial No. 397,261. Divided and this application October 24, 1955, Serial No. 542,502

2 Claims. (Cl. 260—294)

This invention relates to substituted benzamidopropylamines and more particularly to substituted 1-benzamido-3-piperidinopropanes and their acid addition salts, and to the preparation thereof.

The bases of the substituted benzamidopiperidinopropanes of the present invention may be represented by the formula

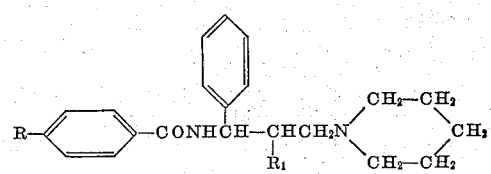

wherein R represents a member of the group consisting of hydrogen and a cyclohexyloxy radical and R₁ represents a member of the group consisting of hydrogen and a methyl radical.

The bases of the new compounds are solids at room temperature. They are relatively insoluble in water, but are soluble in the common polar organic solvents. The acid addition salts of those bases are in general water-soluble, crystalline substances.

The new substituted benzamidopiperidinopropanes and their salts are local anesthetics characterized by stability, lack of irritation and long duration of action. For therapeutic use, the compounds can be advantageously utilized as water solutions of the acid addition salts, or the salts or bases can be incorporated into various pharmaceutical extending media such as ointments, solutions, jellies, oils, lotions, suspending media and the like.

The new compounds can be prepared by methods known to the art, exemplified by the following series of equations, in which R and R₁ have the same significance as hereinabove.

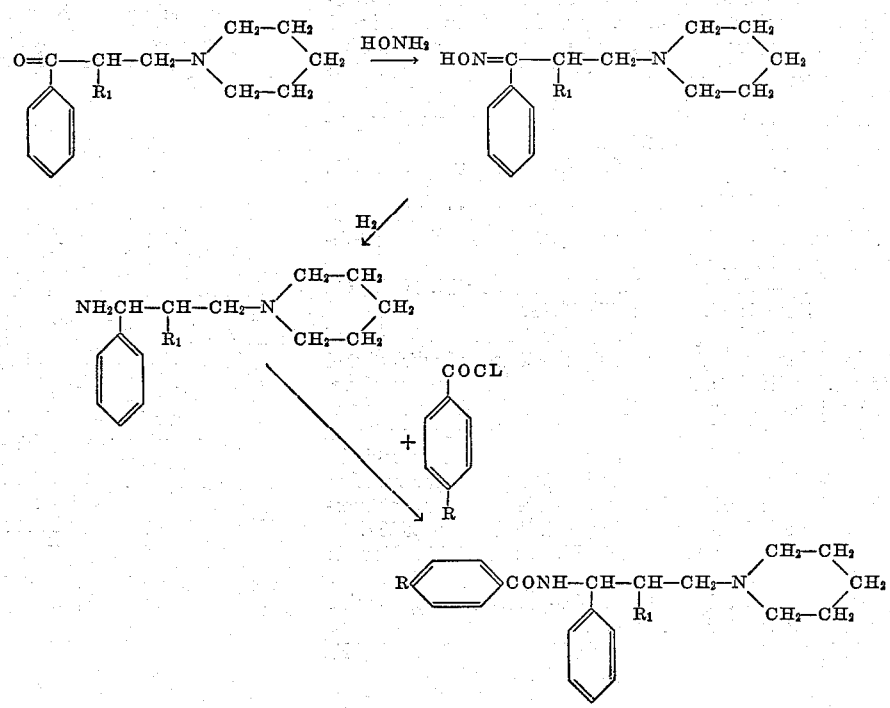

Referring to the equations, it will be seen that a substituted piperidinopropiophenone is treated with hydroxylamine to produce the corresponding oxime, which is hydrogenated to form a substituted phenylpiperidinopropylamine. The piperidinopropylamine is reacted with a substituted benzoyl chloride to form the correspondingly substituted benzamidopiperidinopropane.

As will be evident, the compounds contain a basic nitrogen atom, which can react with acids to form acid addition salts. Such salts are readily prepared by the usual methods of the art, e. g., the reaction of stoichiometrically equivalent amounts of the desired base and a selected acid in a mutual inert solvent. Examples of acids which are suitable for the preparation of acid addition salts of the invention are inorganic acids, for example, hydrochloric, nitric, sulfuric, phosphoric, and the like acids; and organic acids, for example, benzoic, acetic, salicyclic, propionic, maleic, citric and the like acids. The preferred salts are the pharmaceutically useful salts i. e., acid addition salts which are not materially more toxic or irritating than the bases from which they are prepared, and which possess physical characteristics that render them suitable for incorporation into the desired pharmaceutical preparations.

This application is a division of my co-pending application Serial No. 397,261, filed December 9, 1953, which was a continuation-in-part of my co-pending application Serial No. 319,783, filed November 10, 1952, now abandoned.

The following examples more specifically illustrate the preparation and properties of the compounds of this invention.

EXAMPLE 1

*Preparation of 1-benzamido-1-phenyl-3-piperidinopropane hydrochloride*

A mixture of 101.5 g. of β-piperidinopropiophenone hydrochloride, prepared by the method of Adams, Organic Reactions 1, 329 (1942), 31.4 g. of hydroxylamine hydrochloride, 33.6 g. of sodium bicarbonate and 200 ml. of water was allowed to stand at room temperature overnight. A solution of 43 g. of sodium hydroxide in 43 ml. of water was added to the reaction mixture and after cooling, the precipitated β-piperidinopropiophenone oxime was removed by filtration. After recrystallization from methanol, the β-piperidinopropiophenone oxime thus prepared melted at 152–153° C.

*Analysis.*—Calculated for $C_{14}H_{20}N_2O$: N, 12.07. Found: N, 11.75.

β-Piperidinopropiophenone oxime hydrochloride melted at about 190–191° C. after recrystallization from methanol-ethyl acetate mixture.

*Analysis.*—Calculated for $C_{14}H_{21}N_2OCl$: N, 10.40; Cl, 13.19. Found: N, 10.00; Cl, 13.13.

A mixture of 10 g. of Raney nickel caltalyst, 81.5 g. of β-piperidinopropiophenone oxime, 200 ml. of ethanol and 75 ml. of liquid ammonia was placed in an antoclave, and reduced under 1400 lbs. pressure of hydrogen for one hour at 70 to 110° C. The reaction mixture was filtered and fractionally distilled under reduced pressure and the 1-phenyl-3-piperidinopropylamine formed in the reaction distilled at 133–134° C. at a pressure of 1 mm. of mercury. The index of refraction at 25° C. was 1.5231.

*Analysis.*—Calculated for $C_{14}H_{22}N_2$: N, 12.83. Found: N, 12.32.

The maleate salt of 1-phenyl-3-piperidinopropylamine melted at about 150–151° C.

*Analysis.*—Calculated for $C_{22}H_{30}N_2O_3$: C, 58.65; H, 6.71; N, 6.22. Found: C, 58.88; H, 6.78; N, 6.48.

A mixture of 24 g. of 1-phenyl-3-piperidinopropylamine, 24 ml. of benzoyl chloride, 300 ml. of benzene and 45 ml. of dry pyridine was allowed to stand at room temperature for about sixteen hours. A sufficient amount of ethyl ether was thereafter added to bring about complete precipitation of the 1-benzamido-1-phenyl-3-piperidinopropane hydrochloride formed in the reaction. The precipitate was removed by filtration and recrystallized from a mixture of isopropanol and ether.

1-benzamido-1-phenyl-3-piperidinopropane hydrochloride thus prepared melted at about 188–189° C.

*Analysis.*—Calculated for $C_{21}H_{27}N_2OCl$: N, 7.81; Cl, 9.88. Found: N, 7.90; Cl 9.92.

EXAMPLE 2

*Preparation of 1-benzamido-1-phenyl-3-piperidinopropane*

Fifty g. of crystalline 1-benzamido-1-phenyl-3-piperidinopropane hydrochloride were shaken with a mixture of 200 ml. of ether and 200 ml. of dilute aqueous ammonium hydroxide. The ether layer containing the free base was dried over anhydrous magnesium sulfate and the ether was removed by distillation. The residue was dissolved in about 100 ml. of hot ethyl acetate and petroleum ether was added until crystallization occurred. The crystalline precipitate of 1-benzamido-1-phenyl-3-piperidinopropane after recrystallization from a mixture of ethyl acetate and petroleum ether melted at about 111–112° C.

*Analysis.*—Calculated for $C_{21}H_{26}N_2O$: N, 8.09. Found: N, 8.25.

EXAMPLE 3

*Preparation of 1-benzamido-2-methyl-1-phenyl-3-piperidinopropane hydrochloride*

α-Methyl-β-piperidinopropiophenone prepared according to the method of Ruddy, J. A. C. S. 72, 718 (1950), was condensed with hydroxylamine to form α-methyl-β-piperidinopropiophenone oxime. The oxime was reduced with Raney nickel according to the procedure of Example 1 to form 1-phenyl-2-methyl-3-piperidinopropylamine.

1-phenyl-2-methyl-3-piperidinopropylamine thus prepared boiled at about 128–129° C. at a pressure of 0.5 mm. of mercury. The index of refraction at 25° C. was 1.5250.

*Analysis.*—Calculated for $C_{15}H_{24}N_2$: N, 12.06. Found: N, 12.18.

A mixture of 9.7 g. of 1-phenyl-2-methyl-3-piperidinopropylamine, 9.7 ml. of benzoyl chloride, 20 ml. of dry pyridine and 100 ml. of benzene was allowed to stand for about sixteen hours at room temperature. A sufficient amount of ethyl ether was added to the reaction mixture to bring about a complete precipitation of the 1-benzamido-1-phenyl-2-methyl-3-piperidinopropane hydrochloride formed in the reaction. The precipitate was separated, and after recrystallization from a mixture of ethyl acetate and methanol, the 1-benzamido-1-phenyl-2-methyl-3-piperidinopropane hydrochloride melted at about 262–263° C., with decomposition.

*Analysis.*—Calculated for $C_{22}H_{29}N_2OCl$: N, 7.51; Cl, 9.51. Found: N, 7.46; Cl, 9.40.

1-benzamido-1-phenyl-2-methyl-3-piperidinopropane was prepared from 1-benzamido-1-phenyl-2-methyl-3-piperidinopropane hydrochloride by the procedure of Example 2.

EXAMPLE 4

*Preparation of 1-(4'-cyclohexyloxybenzamido)-1-phenyl-3-piperidinopropane hydrochloride*

1-phenyl-3-piperidinopropylamine was prepared according to the process of Example 1. A mixture of 5.8 g. of 4-cyclohexyloxybenzoyl chloride, 8 ml. of pyridine, 4 g. of 1-phenyl-3-piperidinopropylamine and 50 ml. of benzene was warmed on a steam bath for about one hour. The reaction mixture was cooled, and sufficient ether was added to bring about complete precipitation of the 1-(4'-cyclohexyloxybenzamido)-1-phenyl-3-piperidinopropane hydrochloride formed in the reaction. The precipitate was removed and recrystallized from a mixture of isopropanol and ether and then from a mixture of methanol and ethyl acetate. The 1-(4'-cyclohexyloxybenzamido)-1-phenyl-3-piperidinopropane hydrochloride thus prepared melted at about 183–184° C.

*Analysis.*—Calculated for $C_{27}H_{36}N_2O_2 \cdot HCl$: N, 6.13; Cl, 7.76. Found: N, 6.28; Cl, 7.66.

By subjecting 1-(4'-cyclohexyloxybenzamido)-1-phenyl-3-piperidinopropane hydrochloride to the procedure of Example 2, there was obtained 1-(4'-cyclohexyloxybenzamido)-1-phenyl-3-piperidinopropane.

EXAMPLE 5

*Preparation of 1-(4'-cyclohexyloxybenzamido)-1-phenyl-2-methyl-3-piperidinopropane hydrochloride*

A reaction mixture containing 10 g. of 1-phenyl-2-methyl-3-piperidinopropylamine prepared according to the procedure of Example 3, 13.8 g. of p-cyclohexyloxybenzoyl chloride, 20 ml. of dry pyridine and 100 ml. of benzene was refluxed on a steam bath for about one hour. The reaction mixture was diluted with about 150 ml. of ethyl acetate, and cooled, whereupon 1-(4'-cyclohexyloxybenzamido)-1-phenyl-2-methyl - 3 - piperidinopropane hydrochloride precipitated. The precipitate was removed by filtration and was crystallized from ethyl acetate, whereupon 1-(4'-cyclohexyloxybenzamido)-1-phenyl-2-methyl-3-piperidinopropane hydrochloride was obtained, melting at about 220–221° C. with decomposition.

*Analysis.*—Calculated for $C_{26}H_{36}N_2O_2 \cdot HCl$: Cl, 7.53. Found: Cl, 7.31.

1-(4'-cyclohexyloxybenzamido)-1-phenyl - 2-methyl - 3-piperidinopropane base was prepared from 1-(4'-cyclohexyloxybenzamido)-1-phenyl-2-methyl-3 - piperidinopropane hydrochloride by the procedure of Example 2.

EXAMPLE 6
*Preparation of 1-benzamido-1-phenyl-3-piperidinopropane maleate*

To a solution of 32.2 g. of 1-benzamido-1-phenyl-3-piperidinopropane (prepared according to the procedure of Example 2) in 100 ml. of ethanol is added a solution of 3.8 g. of maleic acid in 10 ml. of ethanol. The solution is thoroughly mixed, and evaporated to dryness in vacuo, whereby the maleic acid salt of 1-benzamido-1-phenyl-3-piperidinopropane is recovered.

By following the above-described procedure, except that sulfuric acid, citric acid, phosphoric acid, lauric acid, acetic acid and butyric acid are used, the sulfate, citrate, phosphate, laurate, acetate and butyrate salts of 1-benzamido-1-phenyl-3-piperidinopropane, respectively, are recovered.

I claim:

1. A compound selected from the group consisting of 1-(4'-cyclohexyloxybenzamido)-1-phenyl - 3 - piperidinopropane represented by the formula:

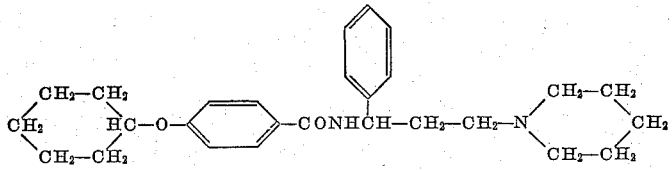

and acid addition salts thereof.

2. 1-(4'-cyclohexyloxybenzamido)-1-phenyl-3-piperidinopropane represented by the formula:

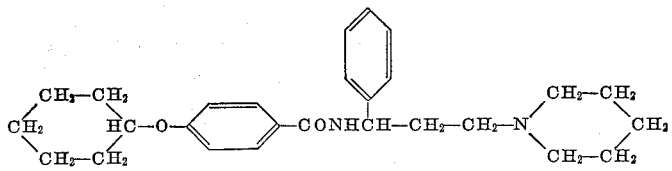

No references cited.